US007099029B2

(12) United States Patent
Hopper

(10) Patent No.: US 7,099,029 B2
(45) Date of Patent: Aug. 29, 2006

(54) METHOD FOR ALIGNING TWO OR MORE INDEPENDENT PRINTING SYSTEMS WITH A SINGLE CONTROL UNIT AND INTELLIGENT PRINT CONTROLLERS

(75) Inventor: Samuel N. Hopper, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 09/952,706

(22) Filed: Sep. 14, 2001

(65) Prior Publication Data

US 2003/0053114 A1 Mar. 20, 2003

(51) Int. Cl.
*G06F 15/00* (2006.01)

(52) U.S. Cl. ...................................... 358/1.15; 358/1.1

(58) Field of Classification Search ................. 358/1.1, 358/1.15, 1.9, 1.13–1.14

See application file for complete search history.

(56) References Cited

U.S. PATENT DOCUMENTS 4,796,066 A 1/1989 Morris et al. ................ 355/26
5,258,809 A 11/1993 Wiedemer .................. 399/112
5,461,470 A 10/1995 De Cock et al. ............ 399/228
5,670,995 A 9/1997 Kupcho et al. ............... 347/5
5,835,836 A 11/1998 Hirao ........................ 399/336
6,101,364 A 8/2000 Boehmer et al. ........... 399/361
6,118,956 A 9/2000 Hirao .......................... 399/85
6,141,523 A 10/2000 Bergmann et al. .......... 399/306
6,175,715 B1 1/2001 Hirao et al. ................ 399/384
6,476,923 B1 * 11/2002 Cornell ...................... 358/1.12
6,567,621 B1 * 5/2003 Miyoshi et al. ............... 399/19
6,650,433 B1 * 11/2003 Keane et al. .............. 358/1.15

FOREIGN PATENT DOCUMENTS

DE 280726 A1 7/1990
JP 62265676 * 11/1987

* cited by examiner

*Primary Examiner*—Twyler Lamb
*Assistant Examiner*—Alan Rahimi
(74) *Attorney, Agent, or Firm*—Jose Gutman; Fleit, Kain, Gibbons, Gutman, Bongini & Bianco P.L.

(57) ABSTRACT

A method and system receives a print job from a host device, parses the print job into individual print data for at least two separate printing devices, generates a random set of marks for identification of the print job, embeds the identification marks into the individual print data for a first printing device; and sends the individual print data and the marks to each printing device. Simultaneously, each printing device in the system receives its individual dataset for printing and the set of identification marks from the control unit and starts its print engine at a high speed. The first printing device prints its dataset and the identification marks on at least a first page of the printed dataset. The remaining printing devices then scan the roll of print media until they recognize the matching identification marks and begin printing their individual dataset on the roll of print media.

8 Claims, 6 Drawing Sheets

100

110,112

METHOD FOR ALIGNING TWO OR MORE INDEPENDENT PRINTING SYSTEMS WITH A SINGLE CONTROL UNIT AND INTELLIGENT PRINT CONTROLLERS

BACKGROUND OF THE INVENTION

1. Field of the Invention

This invention generally relates to the field of printer systems, and more particularly relates to a method for aligning two or more independent printing systems.

2. Description of Related Art

A high-speed printing system is used by businesses to print a large volume of information such as bills and account statements. The printing system prints on a continuous, fan-fold type of media that is threaded through the machine. However, it is very difficult for the printing system to print duplex (both sides of the paper). Also, the printing system can only operate from one source, as it is critical that the variable data to be printed remains together.

Printing duplex when running continuous fan-fold forms at high speed requires either large and expensive printing devices, or the use of more than one printing device that can only print on one side. When running more than one independent printing device (which includes a print engine) that are separated by several meters, it becomes critical that the print data that is to match the second side be placed in conjunction with the data printed on the first side by the first print engine. Whether two, three, four or more print engines are used, the data that is printed on the paper by each of the engines must be the matching data for the page.

In non-automated methods, an operator is required to align the print engines by visually inspecting the print and manually indicating to the control unit that the print alignment is correct. This introduces the possibility of potential operator error, which wastes paper and costs valuable time.

Therefore a need exists to overcome the problems with the prior art as discussed above, and particularly for a method of aligning two or more printing systems.

SUMMARY OF THE INVENTION

According to a preferred embodiment of the present invention, a method and system receives a print job from a host device, parses the print job into individual print data for at least two separate printing devices, generates a random set of marks for identification of the print job, embeds the identification marks into the individual print data for a first printing device; and sends the individual print data and information about the marks to each printing device. Simultaneously, each printing device in the system receives its individual dataset for printing and the information for the identification marks from the control unit and starts its print engine at a high speed. The first printing device prints its dataset and the identification marks on at least the first page of the printed dataset. The remaining printing devices then scan the roll of print media until they recognize the matching identification marks and begin printing their individual dataset on the roll of print media. None of the printing devices are required to pause, slow down, or stop prior to printing their individual datasets.

DESCRIPTION OF THE PREFERRED EMBODIMENTS

The present invention, according to a preferred embodiment, overcomes problems with the prior art by allowing two or more independent printing devices to be aligned such that print data that is placed on the paper matches in both registration and content without involvement from a machine operator; and does so in a manner that causes motion of paper media in all separated printing devices to be in unison without pauses or reduction in speed. All separate print engines are aligned under direction of a single control unit, and the single control unit prints sheets that match correctly without regard to the distance between the separate print units. This method takes advantage of a single control unit used to control multiple print engines, and intelligent print controllers located inside each print engine that are able to control optical mark sensors and control the flow of print data to the print engine. This method takes advantage of the single control unit to maintain simultaneous motion through all printing devices, protecting the integrity of the paper media path between the print engines; and takes advantage of the intelligent print controllers located inside each print engine to relieve the single control unit of the responsibility to maintain or be cognizant of the distance between each print engine.

A preferred embodiment uses sensors previously used to verify that the print on each engine was correct to now automatically set proper alignment prior to printing the print data. Once the alignment has been completed, the sensors are returned to normal operation, which verifies every sheet printed subsequent to the automatic alignment. This is done without stopping or slowing down the paper media and without operator involvement.

Figure 1:
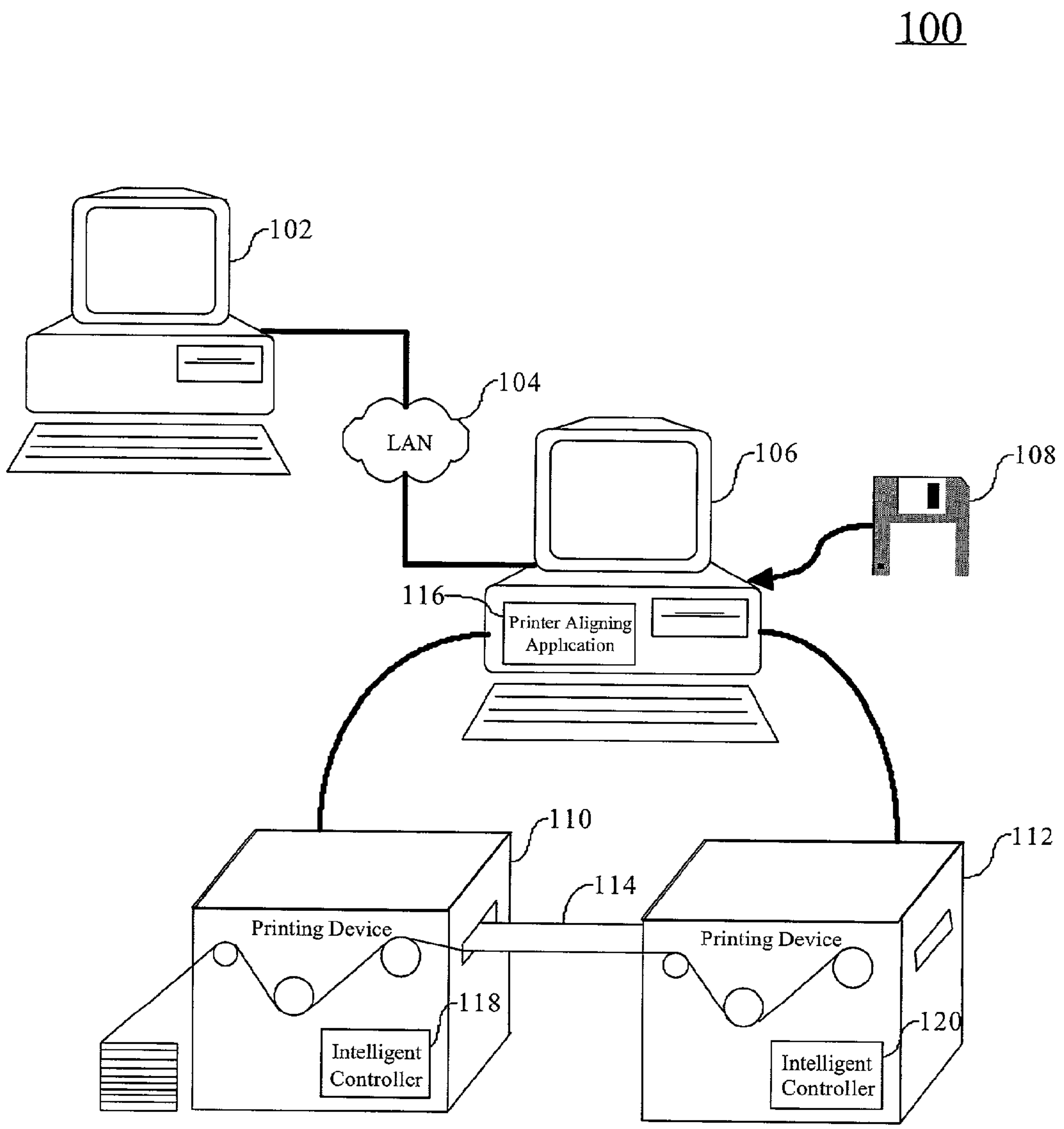
FIG. 1 is a block diagram illustrating an automatically aligning printing system in accordance with a preferred embodiment of the present invention.

FIG. 1 illustrates an exemplary automatically aligning printer system 100 according to a preferred embodiment of the present invention. The automatically aligning printer system 100 includes a host device 102 communicatively coupled to a control unit 106 having an automatic printer aligning application 116, via a local area network interface 104. The local area network interface 104 may be a wired communication link or a wireless communication link. The control unit 106 may also be communicatively coupled with the world-wide-web, via a wide area network interface (not shown) via a wired, wireless, or combination of wired and wireless local area network communication links 104. The control unit 106 is also communicatively coupled to at least two separate printing devices 110, 112. Alternatively, the printing devices 110, 112 are communicatively coupled locally to the host device 102. The printing devices 110, 112 each contain an intelligent controller 118, 120 and a continuous roll of media 114 is threaded through each printing device.

Each host system 102 may include, inter alia, one or more computers. The control unit 106 may include one or more computers and at least one computer readable medium 108.

The computers preferably include means for reading and/or writing to the computer readable medium 108. The computer readable medium 108 allows a computer system to read data, instructions, messages or message packets, and other computer readable information from the computer readable medium. The computer readable medium 108 may include non-volatile memory, such as floppy, ROM, FLASH® memory, disk drive memory, CD-ROM, and other permanent storage that are useful for transporting information, such as data and computer instructions, between computer systems. Furthermore, the computer readable medium 108 may comprise computer readable information in a transitory state medium such as a network link and/or a network interface, including a wired network or a wireless network, that a computer can read.

Figure 2:
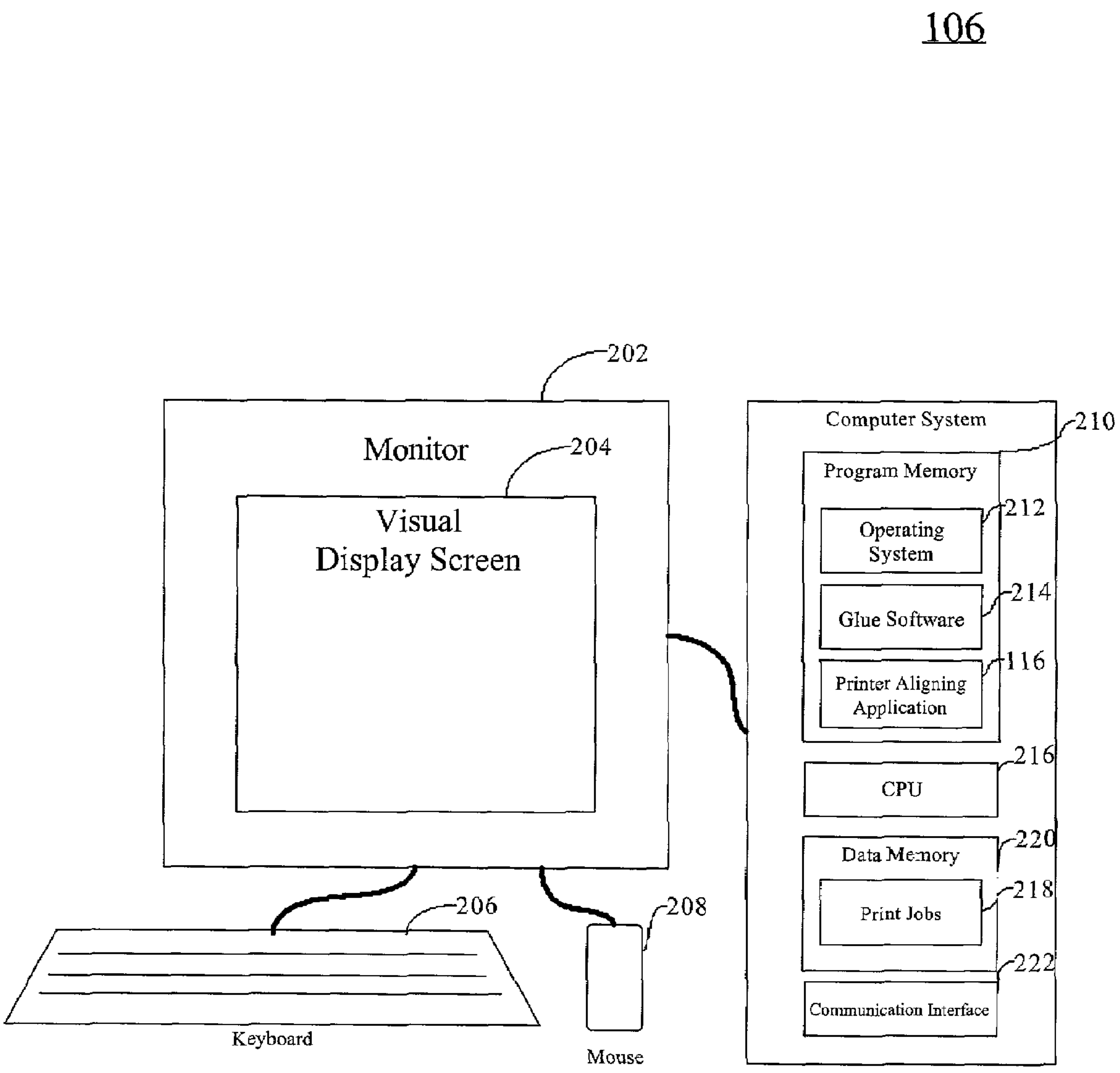
FIG. 2 is a more detailed block diagram showing a control unit in the system of FIG. 1, according to a preferred embodiment of the present invention.

The control unit 106, according to the present example, includes a controller/processor unit 216 (shown in FIG. 2), which processes instructions, performs calculations, and manages the flow of information through the control unit 106. Additionally, the controller/processor 216 is communicatively coupled with program memory 210. Included within program memory 210 are an automatic printer alignment application 116 (which will be discussed in later in greater detail), an operating system platform 212, and glue software 214. The operating system platform 212 manages resources, such as the data stored in data memory 220, the scheduling of tasks, and processes the operation of the automatic printer alignment application 116 in the program memory 210. The operating system platform 212 also manages a graphical display interface (not shown), a user input interface (not shown) that receives inputs from the keyboard 206 and the mouse 208, and communication interfaces 222 for communicating with the network link 104 and individual printing devices 110,112. Additionally, the operating system platform 212 also manages many other basic tasks of the control unit 106 in a manner well known to those of ordinary skill in the art.

Glue software 214 may include drivers, stacks, and low level application programming interfaces (API's) and provides basic functional components for use by the operating system platform 212 and by compatible applications that run on the operating system platform 212 for managing communications with resources and processes in the control unit 106.

Figure 3:
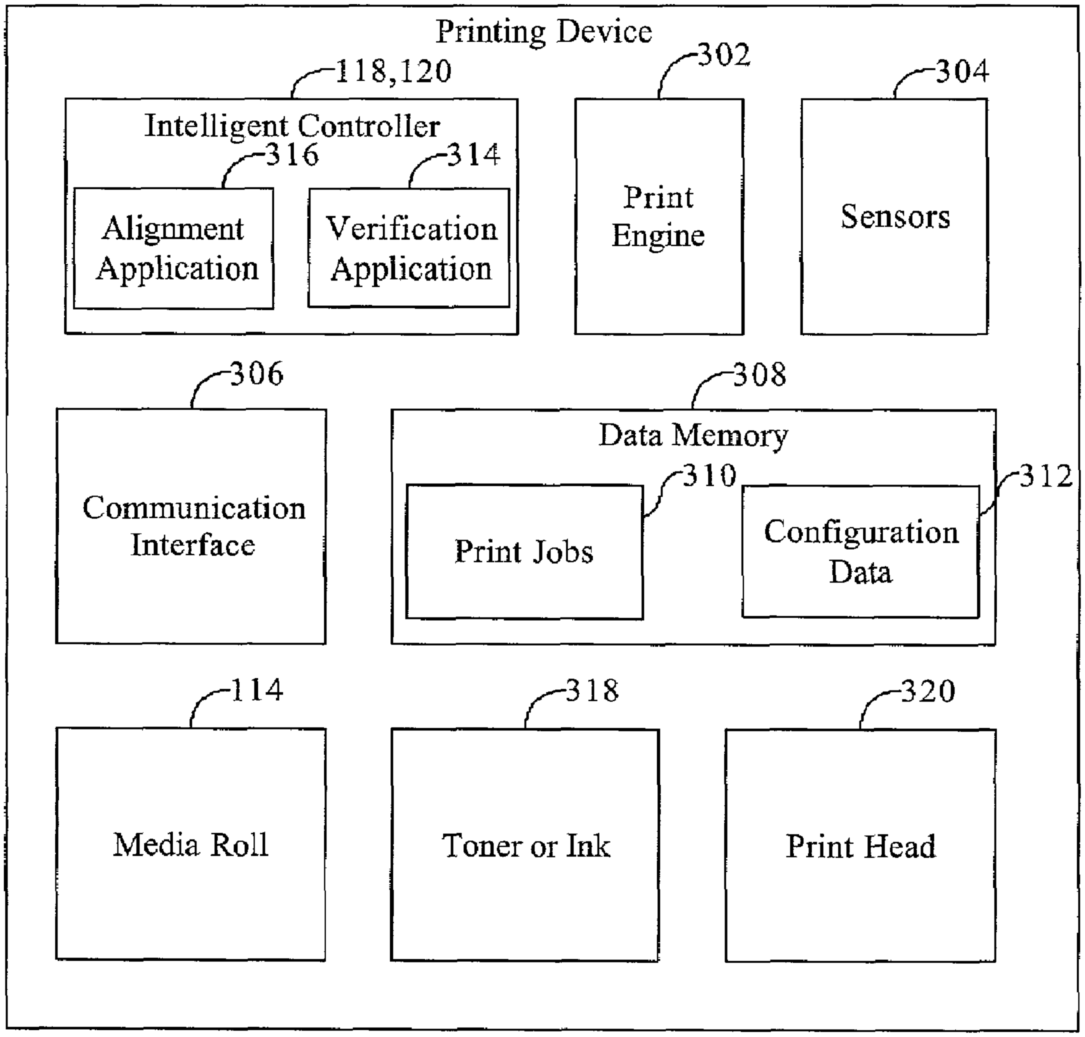
FIG. 3 is a more detailed block diagram showing a printing device in the system of FIG. 1, according to a preferred embodiment of the present invention.

In a preferred embodiment, as shown in FIG. 3, each printing device 110,112 includes an intelligent controller 118,120, having an alignment application 316 and a verification application 314, each application being communicatively coupled to a communication interface 306, sensors 304, and a print engine 302. The print engine 302 is communicatively coupled to a printhead 320. The printhead 320 is typically used to apply toner or ink 318 to a continuous roll of media 114. In accordance with the preferred embodiments of the present invention, the output of electronic images can be applied to many different output mediums. The word "print", as used herein, denotes the output of electronic image from digital representation in a computational system, to a physical medium, such as paper, plastic film, cloth, or other output medium as will be evident to someone of ordinary skill in the art in view of the discussion herein. Lastly, the data memory 308 is communicatively coupled to the intelligent controller 118,120 and may contain a document queue of print jobs 310, and a configuration database 312.

Figure 4:
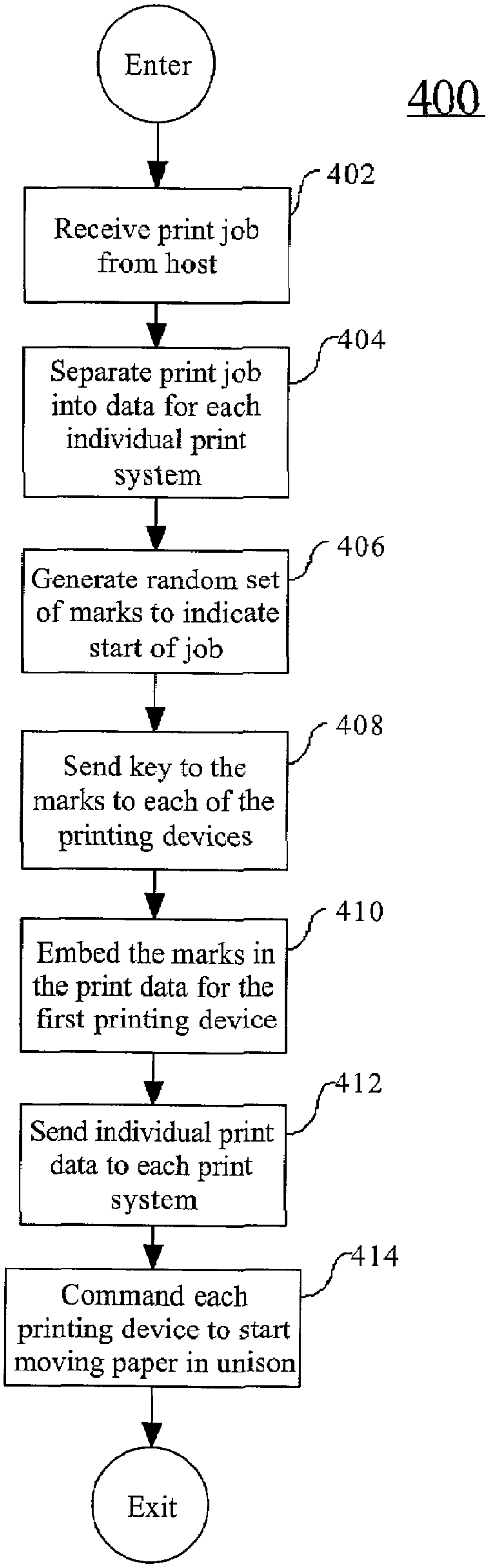
FIGS. 4, 5 and 6 are operational flow diagrams illustrating exemplary operational sequences for the system of FIG. 1, according to a preferred embodiment of the present invention.
Figure 5:
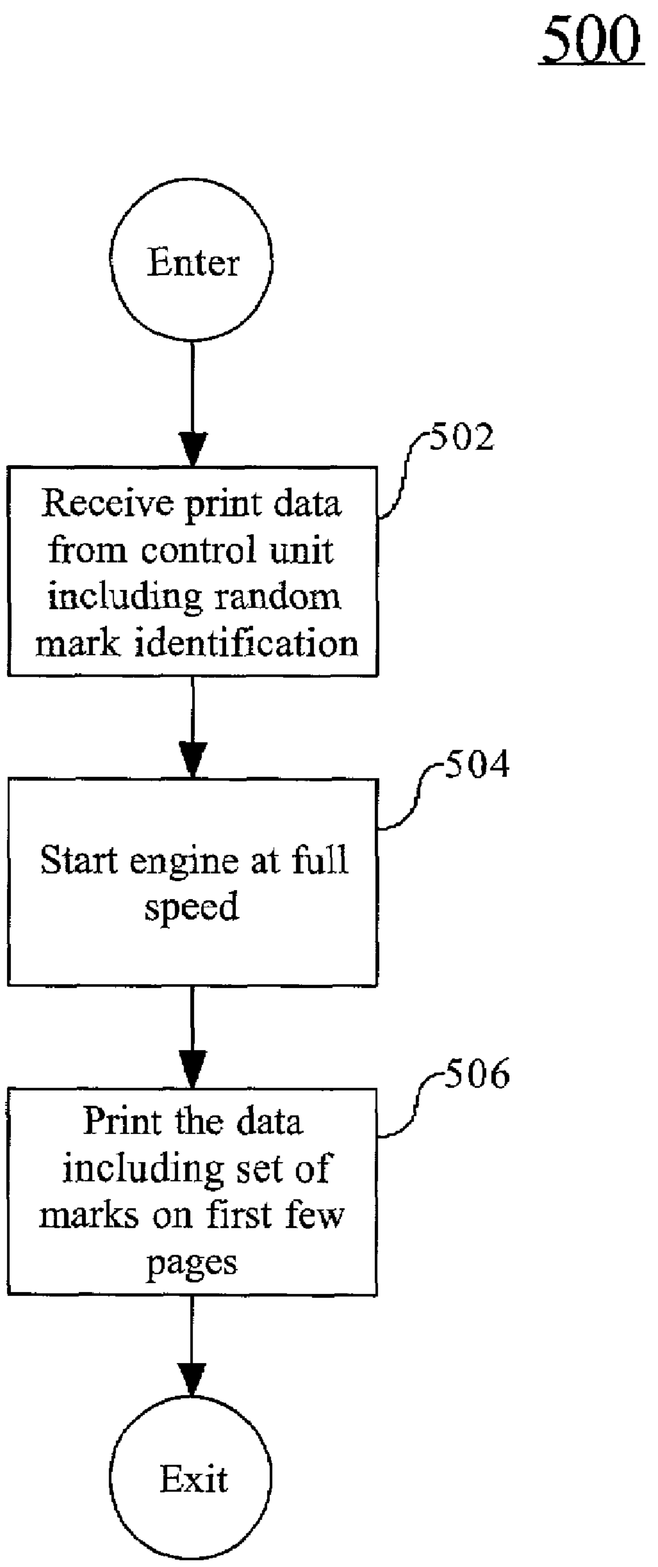
Figure 6:
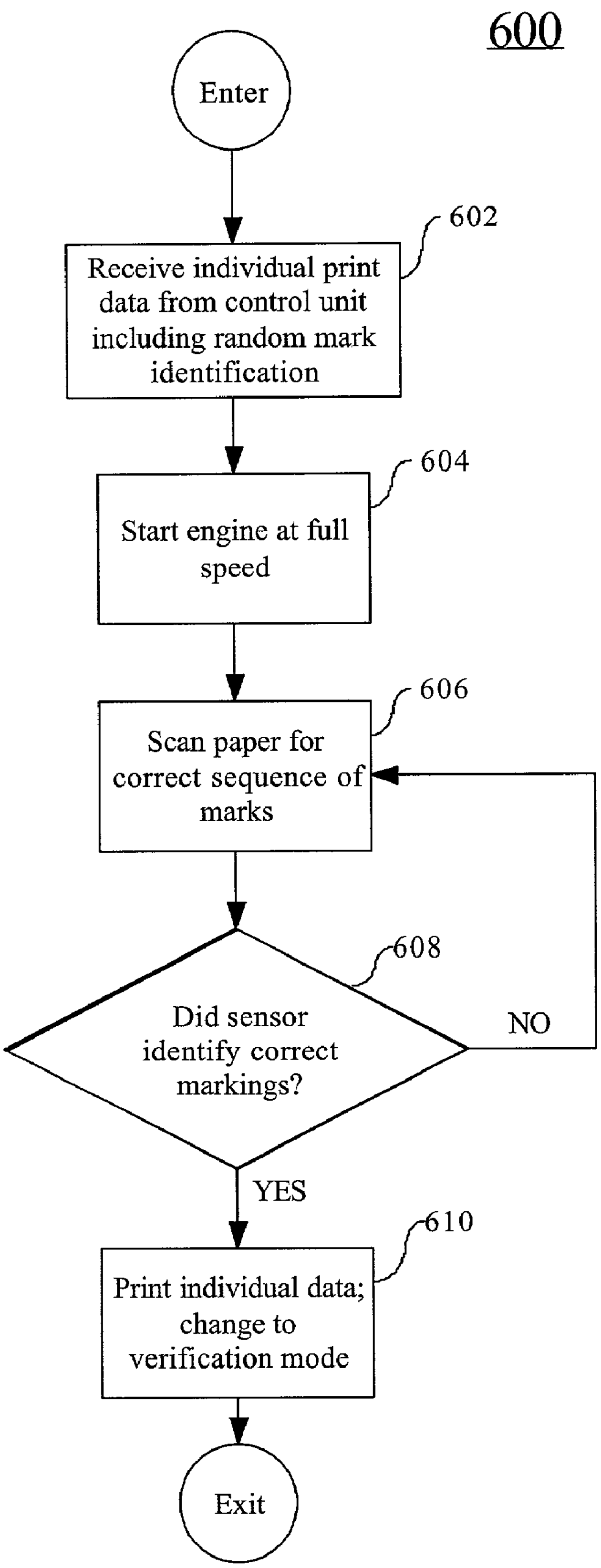

FIGS. 4, 5 and 6 are operational flow diagrams illustrating exemplary operational sequences for the automatically aligning printer system 100 of FIG. 1. The system 100 enters the sequence at step 402, wherein a control unit 106 receives a request to print data from a host device 102. The control unit 106 processes the data, at step 404, such that the correct print data is separated for direction into the correct printing device 110, 112. For example, for duplex printing, the front side data may be prepared for transmission to the first printing device 112, and the back side data may be prepared for transmission to the second printing device 110. Likewise, magnetic ink character recognition (MICR) data may be separated to be sent to a MICR-capable printing device, and different color separations (blue, green, red, etc.) may be separated to be sent to yet another printing device.

As is typical for the system, the control unit 106 applies encoded marks to the print job to allow the intelligent print controllers 118,120 to detect mismatched print data as the paper moves through the system. Having previously loaded (threaded) paper 114 through all of the separate printing devices, an operator allows the print job to start.

The control unit 106, at step 406, builds unique print data to be printed which includes a trivial set of encoded marks, which are able to be sensed by the existing, inexpensive, limited-capability optical sensors 304 in each of the printing devices 110,112. The encoded marks are designed, within the limitation of the optical sensor 304, to be decoded into a 7-bit (1 to 127 decimal) number. Multiple sets of these encoded marks may be printed on one page, or on multiple pages if the page size is too small, to allow for a unique ("random") numerical sequence to be described. The number of sets of the encoded marks is made to ensure detection of the unique numerical sequence; even with the loss of one or more of the sets because of poor read rate of the optical sensor, or poor print quality of the marks. Also, because of the unique pattern, failures in printing devices 110,112 that leave many sets of marks in the paper path are of no consequence.

The control unit 106, in step 408, sends the "key" (description of the proper unique sequence) to each of the intelligent print engine controllers 118,120 located inside each of the printing devices 110,112. The control unit 106, at step 410, sends the special print data containing the encoded marks to the first printing device 112, and may also send the special print data to another of the multiple printing devices if the marks must be printed on both sides of the paper 114 for one or more devices past the second device 110. The control unit 106, at step 412, then sends the previously separated print job, in proper separations, to each respective printing device 110,112. The control unit 106, at step 414, then commands all printing devices 110,112 to begin moving paper 114 in unison.

The first printing device 112, at step 502, receives its print data from the control unit 106, starts its engine at step 504, prints the special marks, then prints the print job at step 506. The second (and third, and fourth, and . . . ) printing device 110, at step 606, watches for the encoded marks, and simply "prints" blank paper. As the encoded marks reach each subsequent printing device, the intelligent print controller 118,120 verifies the unique pattern required to signal proper alignment, at step 608, and then prints the print job on the paper 114, at step 610, as it continues to move in a forward direction. The paper 114 does not slow, pause, stop, or reverse during the alignment. The media always travels at fill speed forward.

If necessary, the intelligent print controller 118,120 may signal the master control unit 106 to stop and allow small (less than one sheet size) changes in the paper position be made by the individual intelligent print controller 118,120. When this occurs, all print engines stop in unison, and no paper 114 can ever be moved backward or forward at a slow speed, and the control unit 106 would then begin paper movement on all print engines again in unison.

Once the individual intelligent print controller 118,120 detected the correct encoded sequence, and begins to print the print job, it automatically switches to "verify" mode and uses the encoded marks normally added by the control unit 106 to begin the verification checking.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carryout these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:

receiving a single print job from a host;

parsing the single print job into a first and a second individual print data for a first and a second separate printing devices, respectively;

generating a random set of marks for identification of the single print job;

embedding the random set of identification marks into the first individual print data for subsequent printing on a print media with the first individual print data by the first printing device;

sending the first individual print data to the first printing device;

sending the random set of marks for identification to the second printing device;

moving the print media through each of the first and second separate printing devices in unison; and printing the single print job by printing the first individual print data including the random set of marks for identification onto the print media by the first printing device and printing the second individual print data onto the print media by the second printing device.

2. A method comprising the steps of:

receiving a print job from a host;

parsing the print job into individual print data for at least two separate printing devices;

generating a random set of marks for identification of the print job;

embedding the random set of identification marks into the individual print data for a first printing device;

sending the individual print data and the random set of marks to each printing device;

starting to move print media through each of the at least two separate printing devices from a stopped state; and printing the individual print data for the first printing device including the random set of marks for identification onto the print media by the first printing device.

3. The method of claim 2, wherein the step of starting to move print media comprises starting each of the at least two separate printing devices independently.

4. The method of claim 2, wherein the step of starting to move print media comprises starting each of the at least two separate printing devices in unison.

5. A computer readable medium including computer instructions for driving a control unit, the computer instructions comprising instructions for:

receiving a single print job from a host;

parsing the single print job into a first and a second individual print data for a first and a second separate printing devices, respectively;

generating a random set of marks for identification of the single print job;

embedding the random set of identification marks into the first individual print data for subsequent printing on a print media with the first individual print data by the first printing device;

sending the first individual print data to the first printing device;

sending the random set of marks for identification to the second printing device;

starting to move the print media through each of the first and second separate printing devices in unison; and printing the single print job by printing the first individual print data including the random set of marks for identification onto the print media by the first printing device and printing the second individual print data onto the print media by the second printing device.

6. A computer readable medium including computer instructions for driving a control unit, the computer instructions comprising instructions for:

receiving a print job from a host;

parsing the print job into individual print data for at least two separate printing devices;

generating a random set of marks for identification of the print job;

embedding the random set of identification marks into the individual print data for a first printing device;

sending the individual print data and the random set of marks to each printing device;

starting to move print media through each of the at least two separate printing devices from a stopped state; and printing the individual print data for the first printing device including the random set of marks for identification onto the print media by the first printing device.

7. The computer readable medium of claim 6, wherein the step of starting to move print media comprises starting each of the at least two separate printing devices independently.

8. The computer readable medium of claim 6, wherein the step of starting to move print media comprises starting each of the at least two separate printing devices in unison.

* * * * *